United States Patent [19]

Marly

[11] 4,304,470
[45] Dec. 8, 1981

[54] SPECTACLE FRAME WITH PIVOTABLE AUXILIARY BRIDGE

[75] Inventor: Jacques Y. Marly, La Norville, France

[73] Assignees: La Chemise Lacoste, Paris; Cahours de Virgile, Boulogne-sur-Seine, both of France

[21] Appl. No.: 46,213

[22] Filed: Jun. 7, 1979

[30] Foreign Application Priority Data

Jun. 14, 1978 [FR] France .................. 78 17772

[51] Int. Cl.³ .............................................. G02C 5/12
[52] U.S. Cl. .......................................... 351/130; 2/13
[58] Field of Search ................. 351/94, 129, 121, 122, 351/123, 124, 125, 126–130, 137, 88, 138; 350/132, 138, 140; 2/426, 13; D16/65

[56] References Cited

U.S. PATENT DOCUMENTS 2,410,141 10/1946 Zell ...................................... 351/137
4,045,137 8/1977 Bradley ............................... 351/137

Primary Examiner—John K. Corbin
Assistant Examiner—B. W. de los Reyes
Attorney, Agent, or Firm—Merriam, Marshall & Bicknell

[57] ABSTRACT

The invention relates to an improved spectacle frame in which a curved auxiliary bridge is provided below a bridge rigidly joining the rims of the spectacle lenses, this auxiliary bridge being turnably mounted between the rims in such wise as to freely adapt to the slope of the nose of the wearer.

4 Claims, 3 Drawing Figures

U.S. Patent                Dec. 8, 1981                4,304,470
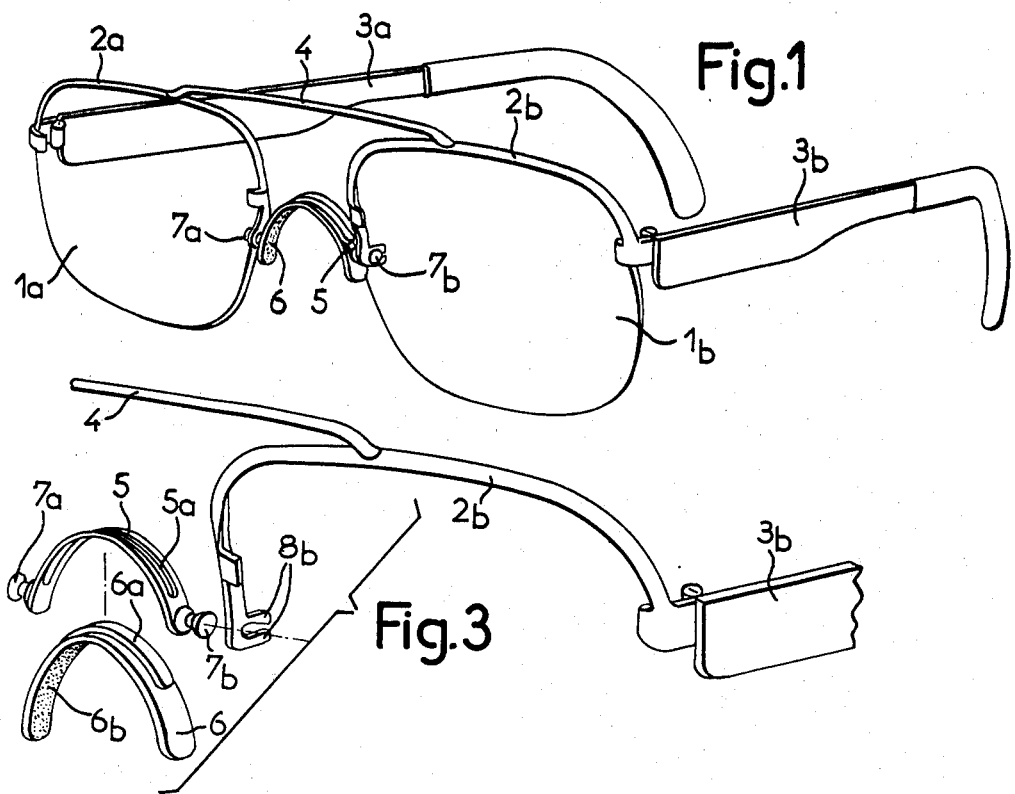
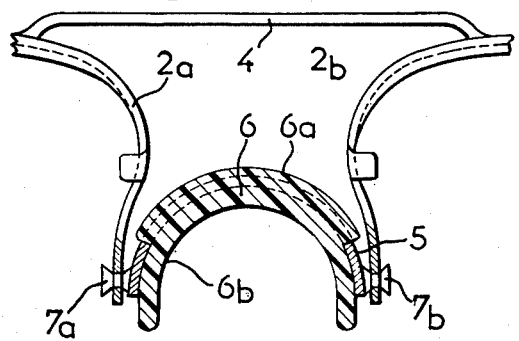

SPECTACLE FRAME WITH PIVOTABLE AUXILIARY BRIDGE

BACKGROUND OF THE INVENTION

The present invention relates to a spectacle frame.

The most common spectacle frames rest on the bridge of the nose of the person wearing the spectacles, either directly by means of the intermediate piece of the frame, or bridge, which rigidly joins the rims, or fronts, of the two lenses to one another, or by means of two support pieces which are respectively integral with the rims of the two lenses. In both cases, it is not possible to achieve a perfect match between the shape of the bridge of the nose of the person wearing the spectacles, on the one hand, and the shape of those parts of the frame which come into contact with the said bridge, on the other hand. This results in a poor stability of the spectacles on the nose of the wearer and also, very frequently, in superficial damage to the skin of the nose at the places where this skin comes into contact with the parts of the frame which have a poorly matching shape. U.S. Pat. Nos. 4,032,223 and 3,476,458 refer to spectacle frames of this general type.

Spectacle frames are also known which comprise, below a bridge rigidly joining the rims of the two lenses, an auxiliary bridge, the shape of which is adapted to straddle the bridge of the nose of the person wearing the spectacles. In a first known embodiment, the auxiliary bridge has a fixed, although adjustable, position relative to the rest of the frame. In another known embodiment, the auxiliary bridge can pivot through only a very small angle relative to the rest of the frame.

It is an object of the present invention to provide an improved spectacle frame which avoids the disadvantages of the frames produced hitherto.

SUMMARY OF THE INVENTION

According to the present invention a spectacle frame comprises, below a bridge rigidly joining the rims of the two lenses, a curved auxiliary bridge, the shape of which is adapted for straddling the bridge of the nose of the person wearing the spectacles. The invention is characterised in that the auxiliary bridge is connected to each rim respectively by pin means, so that the auxiliary bridge can pivot, relative to the rims, freely and virtually without angular restriction.

By freely pivoting the auxiliary bridge relative to the rest of the frame, the auxiliary bridge can spontaneously adjust its position in use, to match the shape and the slope of the bridge of the nose of the person wearing the spectacles, without requiring prior adjustment. This results not only in an increase in the stability of the spectacles on the nose of the wearer, but also in a better contact between the bridge of the nose and the part of the frame bearing thereon, and this prevents or delays superficial damage to the skin of the nose caused by prolonged contact with the skin-contacting part of the frame.

In a preferred embodiment of a spectacle frame according to the present invention, each end of the auxiliary bridge carries, on its convex side, pin means on which the corresponding lens rim, or an appendage of this rim, is engaged by means of an opening which is slightly wider than the diameter of the said pin means, and axial holding means are provided to turnably secure each pin means in place. As a result of this arrangement, the frame is easier to manufacture and can have a lower cost price.

BRIEF DESCRIPTION OF THE DRAWINGS

By way of illustrative example, one embodiment of a spectacle frame according to the present invention is described below and is illustrated schematically in the accompanying drawing, in which:

FIG. 1 shows the embodiment in perspective,

FIG. 2 is a front view of the central part of the embodiment, in partial section on an enlarged scale, and FIG. 3 is a partial exploded view of the central part of the frame.

DESCRIPTION OF THE PREFERRED EMBODIMENT

In FIG. 1, $1a$ and $1b$ denote two spectacle lenses of which only the upper edges are embedded in rims $2a$ and $2b$ to which side-pieces $3a$ and $3b$ of the frame are respectively articulated in a manner which is in itself known. The rims $2a$ and $2b$ of the two lenses are rigidly joined to one another by means of a bridge 4 which can have any shape, optionally different from that illustrated in the drawing, but which is in any case arranged so that it does not come into contact with the bridge of the nose of the person wearing the spectacles.

According to the present invention, an auxiliary bridge 5, the shape of which is adapted to straddle the bridge of the nose of the person wearing the spectacles, that is to say generally in the form of a curved strip, is located below the main rigid bridge 4. As shown in FIGS. 2 and 3, the auxiliary bridge 5 consists of a thin metal curved strip which is provided with a centrally located slot $5a$. According to another advantageous characteristic of the invention, the auxiliary bridge 5 is provided, on its concave side, with an arcuate pad of elastic material 6, consisting, for example, of a moulded strip of silicone rubber, one face of which possesses a narrow projection $6a$ which will resiliently engage in the slot $5a$ in the metal bridge 5, whilst the opposite face $6b$ of the said strip 6 possesses a slight roughness (e.g. such as will originate during moulding). In the illustrated embodiment, each end of the auxiliary bridge 5 is equipped with an outwardly extending stud, having an enlarged end, $7a$ or $7b$. The narrowest part of each such stud is dimensioned to snap between elastic limbs of a fork (such as $8b$ see FIG. 3), which is formed integrally with the rim $2a$, $2b$ of the corresponding lens. In the embodiment shown, in which each rim only surrounds the upper edge of the corresponding lens, the fork, such as $8b$, is arranged at the lower end of the inner side of the rim. Although the drawing shows a fork which opens towards the eye of the wearer of the spectacles, it is also possible, without going outside the scope of the invention, to provide a fork which opens in the opposite horizontal direction, or alternatively a fork which opens downwards. Each stud with an enlarged end, $7a$ or $7b$, can have any suitable shape; however, the shape shown in FIG. 2 is particularly advantageous; it corresponds to that of a "diabolo", comprising a central cylindrical bearing, the diameter of which is less than the maximum distance between the two limbs of the corresponding fork, $8a$ or $8b$, and, on either side of this cylindrical bearing, two elements in the form of truncated cones, the outermost of which holds the cylindrical bearing between the elastic limbs of the fork $8a$ or $8b$. This arrangement enables the auxiliary bridge 5, once it has been snapped into place between the rims, to pivot freely relative to the rest of the frame and, in particular, relative to the rims 2a and 2b of the two lenses, without however giving rise to significant free motion.

The present invention is not restricted to the embodiment described above. In encompasses other variants thereof. The studs 7a or 7b can be replaced, for example, by pins which are integral with the ends of the auxiliary bridge 5, and which pass through holes in the ends of the rims 2a and 2b, the pins being provided, on the side of these holes remote from the bridge 5, with holding means of any known type. A pivoting auxiliary bridge can also be provided for spectacle frames in which the lenses are completely round; in this case, the pivotal support of the auxiliary bridge 5 must be provided in suitable appendages to the rims projecting forwardly of the lenses. In the case of the embodiment illustrated, the stud with enlarged ends, 7a and 7b, could be carried directly by the ends of the rims 2a and 2b or by appendages of the latter, it being possible for their enlarged ends to be engaged so as to pivot in suitable recesses in pieces carried by the ends of the auxiliary beidge 5. The covering of elastic material, 6, on the concave side of the auxiliary bridge 5 is optional; it can also consist of synthetic foam and could simply be glued to the auxiliary bridge (i.e. the slot 5a and projection 6a can be dispensed with).

The present invention can be applied to spectacle frames consisting, in whole or in part, of metal or plastics. The auxiliary bridge 5 could optionally consist of a single piece of moulded plastics material.

What I claim is:

1. A spectacle frame comprising:
   rims for two lenses,
   a bridge rigidly joining said rims,
   a curved auxiliary bridge having a concave side shaped to straddle the nose of a person wearing the spectacles,
   an arcuate resilient pad located on the concave side of said auxiliary bridge, said pad having a projection locatable in a slot in said auxiliary bridge, and
   pin means attaching said auxiliary bridge to said rims and permitting said bridge to pivot, relative to said rims, freely and substantially without augular restriction.

2. A spectacle frame as claimed in claim 1, in which each pin means comprises a stud projecting from the convex side of the auxiliary bridge adjacent to its free end, and an opening in the corresponding rim in which the said stud can be located to provide the free turnable mounting of the auxiliary bridge.

3. A spectacle frame as claimed in claim 2, in which the stud has a narrow central portion and the opening is defined betwen adjacent elastic limbs of a fork between which limbs the narrow central portion of the respective stud is snappingly located.

4. A spectacle frame as claimed in claim 3, in which the stud is of diabolo shape.

* * * * *